United States Patent
Larsen

(10) Patent No.: US 7,939,956 B1
(45) Date of Patent: May 10, 2011

(54) TORSIONAL PROTECTION SYSTEM AND METHOD FOR WIND TURBINE

(75) Inventor: Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/757,416

(22) Filed: Apr. 9, 2010

(51) Int. Cl.
*H02P 9/04* (2006.01)
*F03D 9/00* (2006.01)

(52) U.S. Cl. ............................. 290/44; 322/58
(58) Field of Classification Search .................... 290/43, 290/44, 54, 55; 322/37, 58
See application file for complete search history.

(56) References Cited

U.S. PATENT DOCUMENTS

| | | | |
|---|---|---|---|
| 3,999,115 A | 12/1976 | South et al. | |
| 4,080,559 A | 3/1978 | Wright et al. | |
| 4,208,687 A | 6/1980 | Sun et al. | |
| 4,218,718 A | 8/1980 | Sun | |
| 4,329,637 A | 5/1982 | Kotake et al. | |
| 6,903,529 B2 * | 6/2005 | Kunzel et al. | 318/611 |
| 7,173,399 B2 * | 2/2007 | Sihler et al. | 322/40 |
| 7,309,930 B2 * | 12/2007 | Suryanarayanan et al. | 290/55 |
| 7,423,352 B2 * | 9/2008 | Suryanarayanan et al. | 290/55 |
| 7,423,411 B2 * | 9/2008 | Sihler | 322/19 |
| 7,518,344 B2 * | 4/2009 | Sihler | 322/58 |
| 7,808,215 B2 * | 10/2010 | Markunas et al. | 322/44 |
| 7,884,581 B2 * | 2/2011 | Markunas et al. | 322/44 |
| 2009/0025488 A1 | 1/2009 | Sihler et al. | |

* cited by examiner

*Primary Examiner* — Nicholas Ponomarenko
(74) *Attorney, Agent, or Firm* — James W. Pemrick; Ernest G. Cusick; Frank A. Landgraff

(57) ABSTRACT

A torsional protection system and method is provided for protecting a wind turbine from undesired torsional oscillations. The torsional protection system includes a detection processing stage that isolates energy contained within a measured signal to a frequency band of interest. An input to the detection processing stage is obtained from at least one component in the wind turbine. A protection logic stage compares the energy to a threshold level to get an indication of an amount of the energy that is above a predetermined threshold. The torsional content of the signal can be measured and monitored so that if the torsional content exceeds the predetermined threshold for a predetermined time an alarm or trip signal can be generated.

17 Claims, 5 Drawing Sheets

TORSIONAL PROTECTION SYSTEM AND METHOD FOR WIND TURBINE

BACKGROUND OF THE INVENTION

The embodiments disclosed herein relate generally to wind turbines and more particularly to a system and method for protecting wind turbine generators from undesired torsional oscillations.

The quality of power distributed through modern electrical distribution systems continues to be an issue concerning operators of large systems. One such power quality problem is known as voltage flicker. Voltage flicker is a voltage dip that is of a magnitude sufficient to have an objectionable effect on other loads connected to the same circuit. The disturbance may be experienced as only blinking lights, but the magnitude and the frequency of the occurrences determine flicker's impact on system users.

FIG. 1 illustrates a common voltage flicker scenario. Flicker-producing loads 110 on system 100 are typically caused by large motors, welders, or arc-furnaces. These loads are characterized by high inrush currents of relatively short duration, as experienced in the starting of a motor. The motor's inrush current is typically of a low power factor, and causes a voltage dip of increasing magnitude along the feeder up to the point of the load's connection. This causes voltage flicker problems between the load and the source 120, which, when severe enough often leads to a user complaint 130.

The distribution series capacitor 140 has long been recognized as a cost-effective solution to these types of flicker problems. Unfortunately, distribution-class electrical power lines equipped with a distribution series capacitor are subject to two distinct and potentially damaging phenomena, ferroresonance involving transformers and self-excitation of motors during starting. Ferroresonance can be a severe and rapidly building oscillatory overvoltage condition caused by system non-linearities that can appear when power transformer cores saturate. These non-linearities interact with the series capacitor to produce a low-frequency resonant condition, often in response to large inrush currents following breaker operations. Self-excitation of induction motors is a potentially damaging condition that can occur on the same system. The term "self-excitation" refers to sub-harmonic oscillations that may occur in an electric supply circuit that includes series capacitors. The sub-harmonic oscillations result from the interaction between the series capacitors and an induction motor when the motor is in the process of starting. These oscillations are typically characterized by motor starting problems and sustained overcurrent conditions.

When ferroresonance occurs, immediate action should be taken to prevent damage to other equipment. Ferroresonance is a rapidly occurring, high magnitude, and low frequency oscillation capable of reaching power system voltage levels of 100-200% above normal for brief periods. When self-excitation occurs, low-frequency oscillations are produced as the motor starting sequence fails. The motor will search for the proper operating frequency, which will cause large current surges as the shaft acceleration alternates.

Power generation sites (e.g., thermal prime movers, induction generators, wind turbines, etc.) are often located very far from load centers. To enable the transmission of power over long distances, the use of series capacitors is often employed to raise the power limits of the resulting long transmission lines. The series capacitors can cause series-resonant oscillations, which have been known to cause damage to generator shafts. Damage could also be inflicted on wind turbine power transmission and control components.

The series-resonant oscillations occur at a sub-harmonic of the supply frequency (typically 60 Hz in North America). This effect has become known as subsynchronous resonance (SSR). The most famous incident involving SSR occurred in 1970 and again in 1971 at the Mohave Generating Station in southern Nevada, USA. A generator experienced a gradually growing vibration that eventually led to a fracture of the shaft section between the generator and the rotating exciter. Investigations determined that an electrical resonance at 30.5 Hz produced torque at 29.5 Hz (the 60 Hz compliment frequency), which was near coincident with the frequency of the second torsional vibration-mode of the turbine-generator at 30.1 Hz. This interaction between the series capacitors and the torsional system is an example of subsynchronous resonance.

BRIEF SUMMARY OF THE INVENTION

According to one aspect of the present invention, a torsional protection system is provided for protecting a wind turbine from undesired torsional oscillations. The torsional protection system includes a detection processing stage that isolates energy contained within a measured signal to a frequency band of interest. An input to the detection processing stage is obtained from at least one component in the wind turbine. A protection logic stage compares the energy to a threshold level to get an indication of an amount of the energy that is above a predetermined threshold. The torsional content of the signal can be measured and monitored so that if the torsional content exceeds the predetermined threshold for a predetermined time an alarm or trip signal can be generated.

According to another aspect of the present invention, a method of protecting a wind turbine from torsional oscillations is provided. The method includes the step of obtaining at least one input signal representative of torsional oscillations from at least one component in the wind turbine. Another step includes detecting a magnitude of energy in a predetermined frequency range, and is followed by a comparing step that compares the magnitude of energy to a predetermined value and a predetermined time. A subsequent step can create an alarm or trip signal if the magnitude of energy exceeds the predetermined value for the predetermined time.

DETAILED DESCRIPTION OF THE INVENTION

The modern utility grid is evolving into a network that includes disparate generation sources located far from load centers. Multiple wind farms, solar power generating stations, and other such "non-conventional" power sources are being connected to the existing power transmission lines. Different suppliers manufacture wind turbines and each supplier can manufacture their wind turbines with different operating characteristics. Solar power suffers the same problem. This wide variability in operating characteristics makes it difficult to connect these non-conventional power-generating sources to the existing transmission lines.

Figure 1:
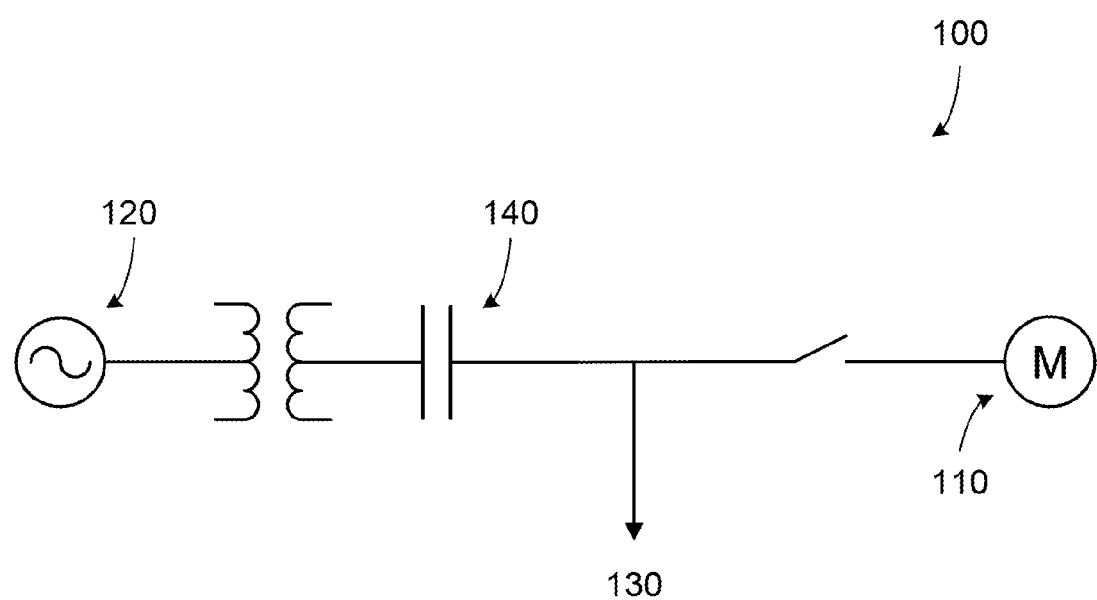
FIG. 1 illustrates a conventional voltage flicker problem in an electrical distribution system.
Figure 2:
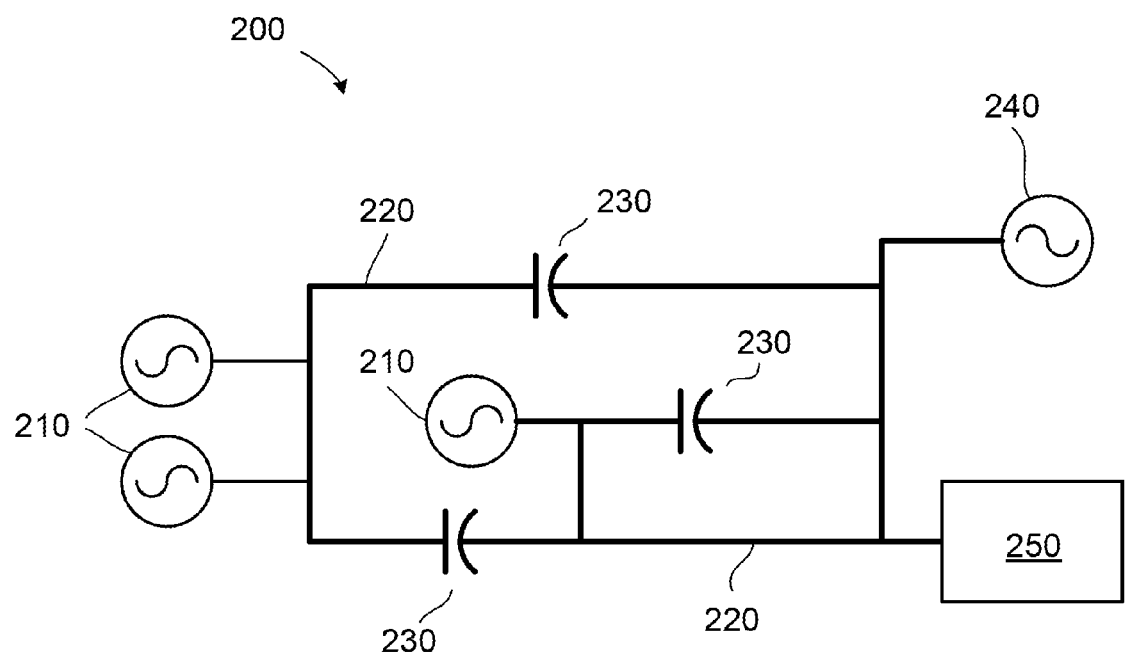
FIG. 2 is a simplified schematic illustration of one known power grid.

FIG. 2 illustrates a simplified example of one typical utility grid 200. One or more non-conventional generating sources 210 can be connected to various parts of the grid. The non-conventional generating sources 210 can comprise various types of prime movers (e.g., wind turbines, wind farms, solar generating stations, etc.), and may be characterized by non-conventional electrical interfaces to the grid.

The non-conventional electrical interfaces may include induction generators or power electronic systems that can interact adversely with lightly damped series resonances in the transmission grid. The non-conventional generating sources 210 can comprise individual sources (e.g., a single wind turbine) or a group of sources (e.g., a wind farm comprising many turbines). Individual wind turbines may have power ratings of about 1.5 to about 5.0 MW or more, and wind farms may have a collective power rating of about 100 to about 500 MW or more. These ranges are for illustrative purposes only and may extend above or below the ranges given.

The grid 200 may also include one or more conventional generating sources 240 and one or more loads 250. Conventional generating sources typically comprise synchronous machines and may have power ratings of about 100 MW to 1300 MW or more per machine. An example of a conventional generating source is a gas or steam powered turbine that drives an electrical generator.

The series capacitors 230 are required in long transmission lines 220 to compensate for the inherent inductive reactance. The disadvantage to series compensation is that it creates lightly damped series resonances having frequency below the synchronous frequency (i.e., subsynchronous). The non-conventional generators 210 can interact with the lightly damped series resonances in the transmission lines 220 in a number of ways, which can cause damage to the generators 210.

The simplest form of non-conventional generation is a wind turbine using a simple induction generator. Radial transmission of large amounts of induction-generated electrical power through series-compensated lines is new to modern power systems because of the rise of wind power. With this new power source comes potential problems, among these problems is a specific subsynchronous phenomenon known as induction generator effect (IGE). The root cause of this effect is that induction machines appear as a negative resistance to electrical oscillations having frequency less than that induced by the rotor speed. When a series capacitor is added to the network, then the resulting subsynchronous series resonance with the inherent inductance of the network will be destabilized by the induction-generator negative resistance effect and can lead to an electrical instability.

Other types of non-conventional generation rely extensively on power electronics to convert power from the prime mover to the electrical characteristic needed by the grid. Power electronics inherently require several complex control algorithms operating at high speed to perform their function. Due to the high-speed nature of the algorithms, there will be substantial interaction with the subsychronous series resonance of the transmission grid that is created by series compensation. These control algorithms are designed based upon a simplified assumption of grid characteristics. It is impractical to design such algorithms to accommodate any arbitrary grid characteristic. Further, the details of these algorithms that govern the interaction phenomena vary with manufacturer and are typically considered highly proprietary.

A transmission line owner/operator may expend a large amount of labor and expense to individually tailor their transmission line to each disparate power source. Alternatively, the developers of each non-conventional power generating station must work in great detail with the vendor(s) of their generating equipment and with the vendor(s) of other non-conventional generating-station developers to coordinate their operating characteristics to accommodate the transmission grid. Such coordination is not only extremely onerous and expensive to achieve, but is prohibited by existing regulations governing competitive generation markets.

A wind turbine's generator has a shaft usually connected via a coupling to a gearbox output shaft. A grid resonance due to series compensation can align and cause sustained torque oscillations in a frequency range of about 30 Hz to about 50 Hz. It is possible for stress to build up on the coupling to a point of damage. In addition, the generator shaft can experience fatigue and possible failure due to these torque oscillations.

Figure 3:
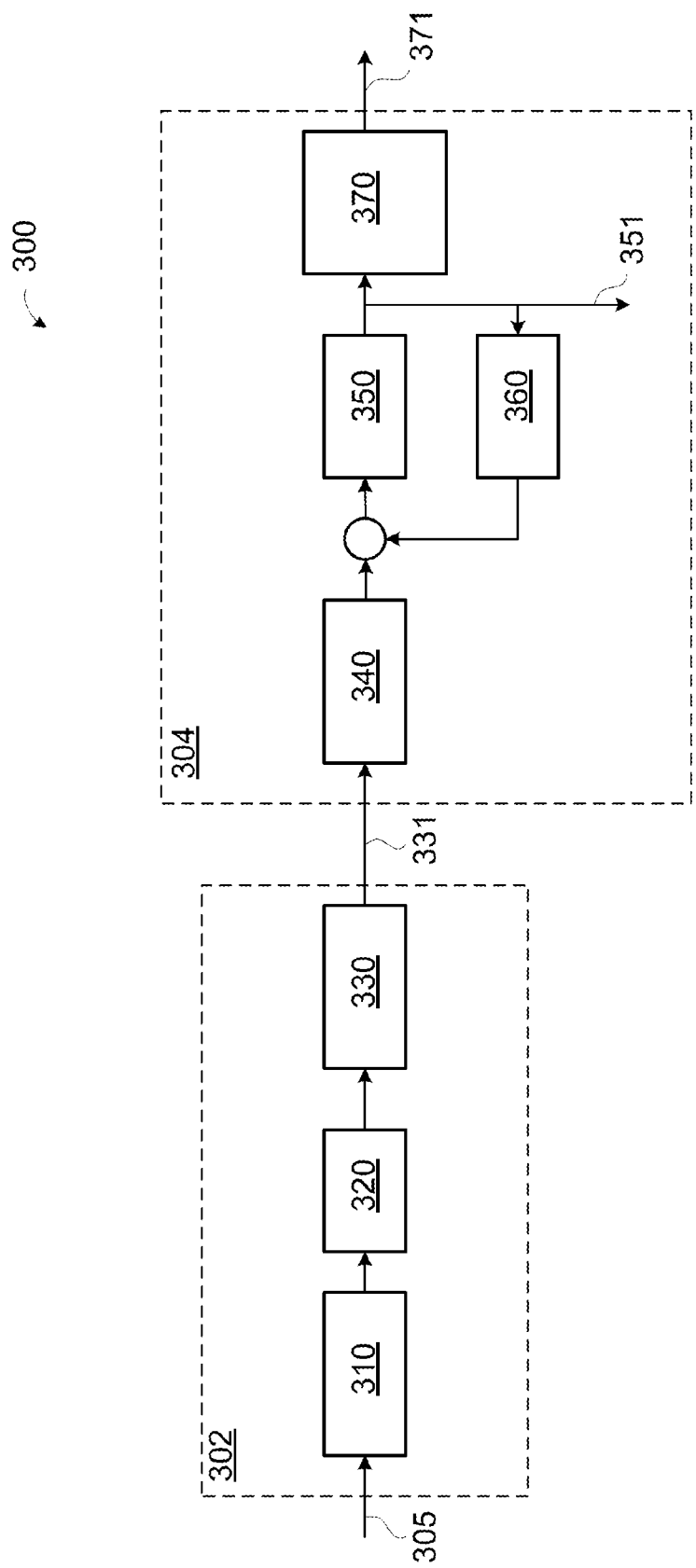
FIG. 3 is a simplified schematic diagram of a torsional protection system, according to one aspect of the present invention.

FIG. 3 illustrates a schematic of a system 300 that can be used to protect a generator from un-desired torsional oscillations. The system 300 includes a detection processing stage 302 and a protection logic stage 304.

The detection processing stage 302 isolates the energy contained within the measured signal to a frequency band of interest. The magnitude of this energy can be derived in the form of a scalar value that can be used to alarm and/or trip the wind turbine if it exceeds predetermined criteria. The detection processing stage 302 can include input 305, a bandpass filter stage 310, absolute value stage 320 and a low pass filter stage 330. The input 305 could be obtained from one or combinations of shaft speed, shaft torque, generator power or generator airgap torque, or could be any other signal representative of the subsynchronous oscillations in the electrical and/or mechanical portions of the wind turbine. As a non-limiting example, the bandpass filter 310 could have a pass band in the range of about 35 Hz to about 50 Hz. The shaft speed and shaft torque may be obtained from the high-speed shaft of the gearbox or the input or output side of the generator rotor shaft. The output 331 of the low pass filter 330 is the magnitude of energy in the frequency band of interest. As a non-limiting example, the low pass filter 330 could have a limit of about 10 Hz. In another aspect of the present invention, a fast Fourier transform (FFT) can be used in detection processing stage 302 to isolate the energy contained within the desired frequency range.

The protection logic stage 304 compares the measured energy to a threshold to get an indication of the amount above that threshold. A time delay is included prior to triggering an alarm or trip command. A reset is also included to reset the timer in the event the measured signal falls back below the threshold prior to triggering the alarm/trip.

The protection logic stage 304 includes a threshold comparison stage 340, integrator stage 350, reset function 360 and alarm/trip detection stage 370. The integrator stage 350 functions as a time delay, which accumulates the amount over the threshold over time. The output 351 of this integrator stage represents the accumulated stress over time since the integrator was last reset. When the integrator output 351 reaches a predetermined level then the alarm and/or trip commands can be triggered via output 371. The reset function 360 decays the integrator output 351 over time when the measured energy falls below the threshold. In other aspects of the present invention, the integrator stage 350 can be replaced with a time delay.

Figure 4:
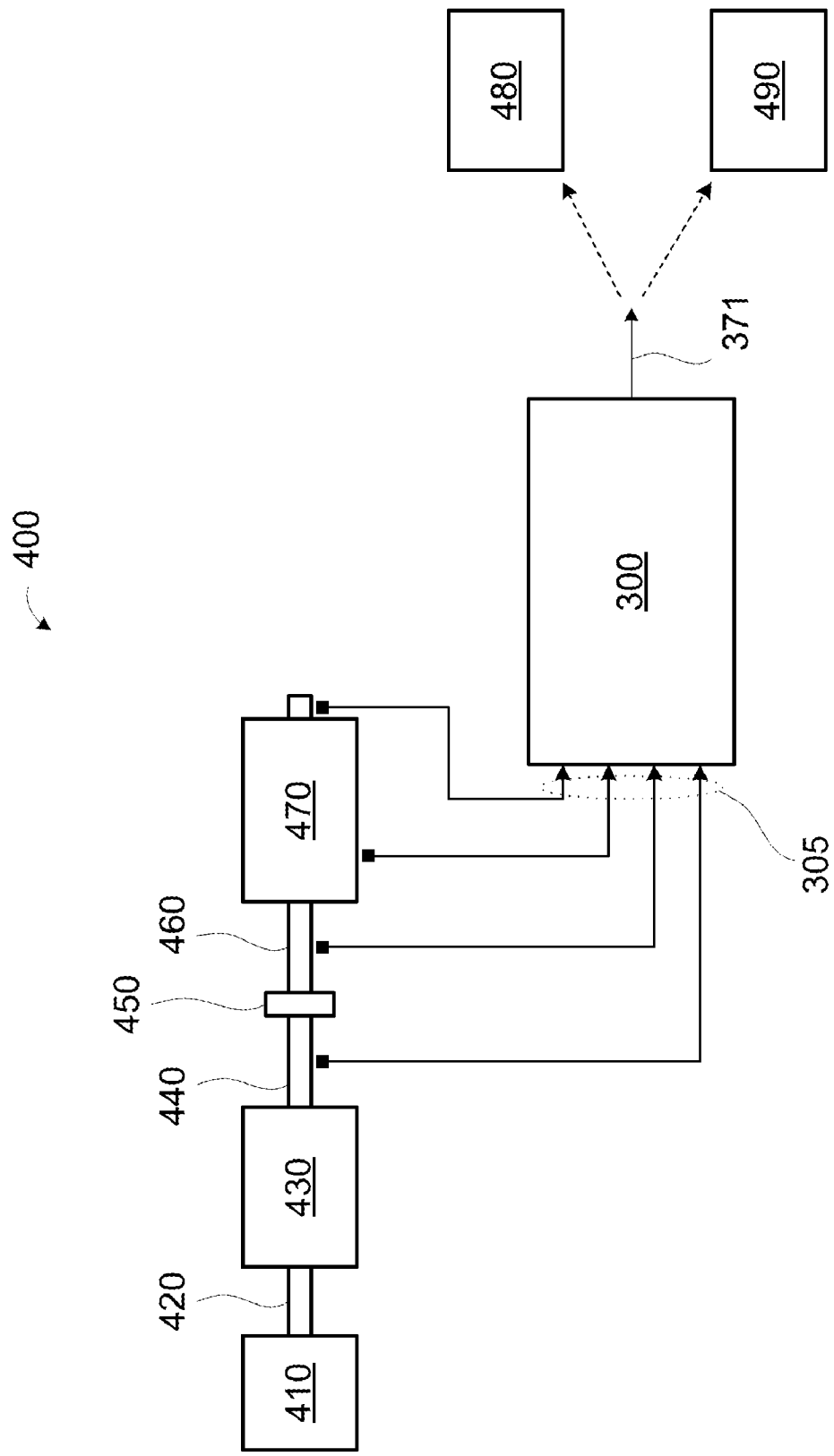
FIG. 4 is a simplified schematic diagram of the torsional protection system in a wind turbine, according to one aspect of the present invention.

FIG. 4 illustrates a simplified schematic view of a wind turbine incorporating the torsional protection system 300, according to aspects of the present invention. The wind turbine 400 may include a rotor 410, low speed shaft 420, gearbox 430, high speed output shaft 440, coupling 450, generator rotor shaft 460 and generator 470. The rotor 410 is driven by the force of the wind passing by one or more blades. A low speed shaft is used as an input to a gearbox 430. The output of the gearbox is the high-speed shaft 440. The high-speed shaft 440 may be connected via a coupling 450 to a generator rotor shaft 460. However, in some applications the coupling 450 may be omitted and/or the high-speed shaft 440 and generator rotor shaft 460 may be a single unit.

The torsional protection system 300 can have one or more inputs taken from various parts of the wind turbine. Speed and/or shaft torque signals can be obtained from the high-speed shaft 440 and/or from generator rotor shaft 460 (at either end of the generator 470). The generator air gap torque can be obtained from generator 470. All or a subset of these signals can be used as inputs 305 for torsional protection system 300. If undesired torsional oscillations are detected, then an alarm or trip signal can be transmitted via output 371. The alarm/trip signal can be sent via wireless or wired link to the turbine controller 480 or to a local or remote monitoring station 490.

Figure 5:
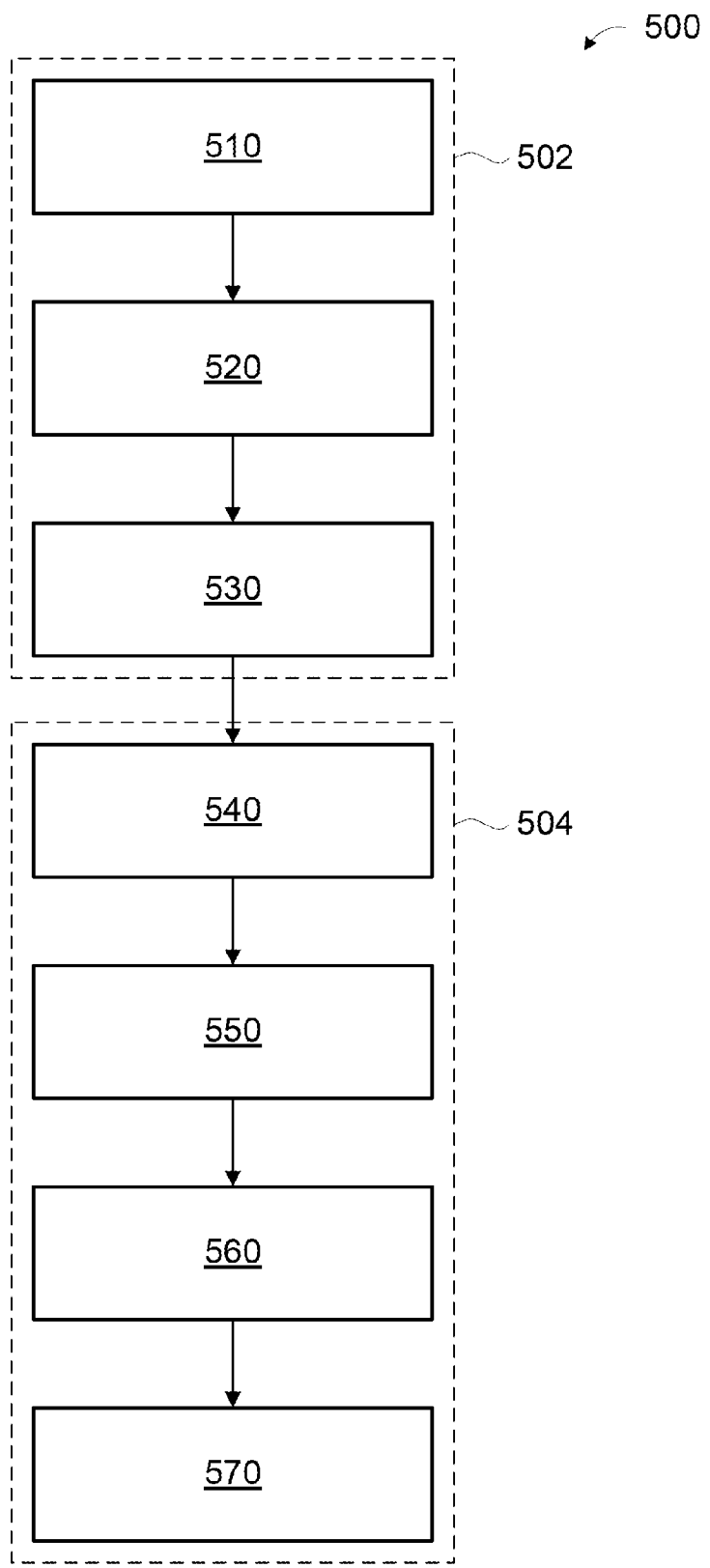
FIG. 5 is flowchart of a method for protecting a wind turbine from torsional oscillations, according to one aspect of the present invention.

FIG. 5 illustrates a method 500 of protecting a wind turbine from torsional oscillations, according to an aspect of the present invention. The method includes two main steps of detecting 502 a magnitude of energy in a predetermined frequency range and comparing 504 the magnitude of energy to a predetermined value and a predetermined time. The method includes a step 510 of obtaining an input signal representative of torsional oscillations from at least one component in the wind turbine. The component can include one or more of high-speed shaft 440, generator rotor shaft 460 and/or generator 470. A filtering step 520 filters the input signal with a band pass filter and is followed by a rectifying step 530 where an output of the band pass filter is rectified with an absolute value stage. Another filtering step 540 filters an output of the absolute value stage with a low pass filter, and is followed by a comparing step 550 that compares an output of the low pass filter to a predetermined value in a threshold comparison stage. An integrating step 560 integrates an output of the threshold comparison stage in an integrator stage. An alarm or trip signal can be created in step 570 if an output of the integrator exceeds a predetermined threshold for a predetermined time. In another aspect of the present invention, the integrator could be replaced with a time delay. In another aspect of the present invention, steps 520, 530 and 540 could be replaced by using a fast Fourier transform to detect a magnitude of energy in a predetermined frequency range.

While the invention has been described in connection with what is presently considered to be one of the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A torsional protection system for protecting a wind turbine, the torsional protection system comprising:
    a detection processing stage that isolates energy contained within a measured signal to a frequency band of interest, the detection processing stage having at least one input obtained from at least one component in the wind turbine;
    a protection logic stage that compares the energy to a threshold level to get an indication of an amount of the energy that is above a predetermined threshold;
    wherein, a torsional content of the signal can be at least one of measured and monitored so that if the torsional content exceeds the predetermined threshold for a predetermined time at least one of an alarm and trip signal is generated.

2. The torsional protection system of claim 1, the detection processing stage further comprising:
    a bandpass filter stage;
    an absolute value stage connected to an output of the bandpass filter; and
    a low pass filter stage connected to an output of the absolute value stage.

3. The torsional protection system of claim 1, wherein the detection processing stage comprises a fast Fourier transform (FFT) stage.

4. The torsional protection system of claim 1, the protection logic stage further comprising:
    a threshold comparison stage connected to an output of the detection processing stage;
    an integrator stage connected to an output of the threshold comparison stage; and
    an alarm stage connected to an output of the integrator stage.

5. The torsional protection system of claim 1, the protection logic stage further comprising:
    a threshold comparison stage connected to an output of the detection processing stage;
    a time delay stage connected to an output of the threshold comparison stage; and
    an alarm stage connected to an output of the time delay stage.

6. The torsional protection system of claim 1, wherein the input to the detection processing stage is chosen from at least one of, or combinations of:
    shaft speed, shaft torque, generator power and generator airgap torque.

7. The torsional protection system of claim 6, wherein the shaft speed is chosen from at least one of, or combinations of:
    generator shaft speed, and gearbox output shaft speed.

8. The torsional protection system of claim 2, wherein the bandpass filter stage comprises a band pass filter having a pass band from about 35 Hz to about 50 Hz.

9. The torsional protection system of claim 2, wherein the low pass filter stage comprises a low pass filter having a limit of about 10 Hz.

10. A method of protecting a wind turbine from torsional oscillations, the method comprising:
    obtaining at least one input signal representative of torsional oscillations from at least one component in the wind turbine;
    detecting a magnitude of energy in a predetermined frequency range;
    comparing the magnitude of energy to a predetermined value and a predetermined time;
    creating an alarm or trip signal if the magnitude of energy exceeds the predetermined value for the predetermined time.

11. The method of claim 10, the detecting step further comprising:
    filtering the at least one input signal with a band pass filter;
    rectifying an output of the band pass filter with an absolute value stage; and
    filtering an output of the absolute value stage with a low pass filter.

12. The method of claim 10, the detecting step further comprising:
    applying a fast Fourier transform (FFT) to the at least one input signal.

13. The method of claim 10, the comparing step further comprising:
    comparing an output of the detecting step to a predetermined value in a threshold comparison stage;
    integrating an output of the threshold comparison stage in an integrator stage; and
    creating an alarm or trip signal if an output of the integrator exceeds the predetermined threshold for a predetermined time.

14. The method of claim 10, further comprising the step of:
    obtaining an input signal representative of torsional oscillations from shaft speed.

15. The method of claim 10, further comprising the step of:
    obtaining an input signal representative of torsional oscillations from shaft torque.

16. The method of claim 10, further comprising the step of:
    obtaining an input signal representative of torsional oscillations from generator power.

17. The method of claim 10, further comprising the step of:
    obtaining an input signal representative of torsional oscillations from generator airgap torque.

* * * * *